(12) United States Patent
Sumida

(10) Patent No.: US 7,825,956 B2
(45) Date of Patent: Nov. 2, 2010

(54) IMAGING DEVICE FOR AUTONOMOUSLY MOVABLE BODY, CALIBRATION METHOD THEREFOR, AND CALIBRATION PROGRAM THEREFOR

(75) Inventor: Naoaki Sumida, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 1594 days.

(21) Appl. No.: 10/349,166

(22) Filed: Jan. 23, 2003

(65) Prior Publication Data
US 2003/0160877 A1 Aug. 28, 2003

(30) Foreign Application Priority Data
Jan. 23, 2002 (JP) ............................ P2002-014545
Dec. 6, 2002 (JP) ............................ P2002-355380

(51) Int. Cl.
H04N 9/73 (2006.01)
(52) U.S. Cl. ...................... 348/223.1; 382/153; 715/863
(58) Field of Classification Search .............. 348/223.1; 382/153; 715/863
See application file for complete search history.

(56) References Cited

U.S. PATENT DOCUMENTS 7,348,962 B2 * 3/2008 Doi et al. ..................... 345/156

2003/0097190 A1 * 5/2003 Watanabe et al. ............ 700/17
2004/0212685 A1 * 10/2004 Smith et al. ............. 348/207.99
2007/0188439 A1 * 8/2007 Kimura et al. .............. 345/102

FOREIGN PATENT DOCUMENTS

| JP | 6-121321 | 4/1994 |
| JP | 10-4558 | 1/1998 |
| JP | 2001-322079 | 11/2001 |
| JP | 2002-144260 | 5/2002 |

* cited by examiner

Primary Examiner—Sinh Tran
Assistant Examiner—Anthony J Daniels
(74) Attorney, Agent, or Firm—Squire, Sanders & Dempsey

(57) ABSTRACT

An imaging device installed on an autonomously movable body which comprises an image-taking section for taking images of the surrounding environment, and an object detecting section for detecting objects and obstacles by processing the obtained images. The imaging device comprises: an image processing section to perform color detection of the images taken by the image-taking section; a white calibration plate for the image-taking section to perform color correction; and a calibration plate control section for moving the calibration plate into a field of view of the image-taking section, wherein it is determined whether color information which is sufficient to perform color detection is obtainable from the images taken by the image-taking section, and color correction is performed using the calibration plate when it is determined that the images taken by the image-taking section do not provide color information sufficient to perform color detection.

11 Claims, 13 Drawing Sheets

IMAGING DEVICE FOR AUTONOMOUSLY MOVABLE BODY, CALIBRATION METHOD THEREFOR, AND CALIBRATION PROGRAM THEREFOR

BACKGROUND OF THE INVENTION

1. Field of the Invention

The present invention relates to an imaging device installed on a movable body which autonomously controls motion thereof based on obtained images, and in particular, the present invention relates to an imaging device for an autonomously movable body which can autonomously calibrate the imaging device, to a calibration method for the imaging device, and to a calibration program for the imaging device.

2. Description of the Related Art

A movable robot has been known in the art, which takes images of the surrounding environment using a camera, determines a moving path for itself while detecting objects and obstacles in the surroundings by processing the obtained images, and autonomously moves along the determined moving path.

When the surrounding images are taken by a camera, the resulting images are often affected by ambient light. In general, an artificial lighting emits light which is different from sunlight, for example, a fluorescent lamp emits more green light than other colors of light, and an incandescent lamp emits more orange light than other colors of light. When images are taken under such artificial lighting, the obtained images may look different from the actual appearance of the objects in terms of color, i.e., the images may exhibit a slight additional color. In order to prevent such phenomenon, a white balance adjustment as a measure for color correction has been known. In general, cameras are classified by the type for performing white balance adjustment, i.e., there are a camera in which the white balance adjustment is fixed, a camera in which the white balance adjustment is automatically performed, and a camera in which the white balance adjustment is manually performed; however, in the case of a camera having a function of automatic white balance adjustment, the automatic color correction may be too excessively performed to create images having realistic colors. On the other hand, in the case of a camera having a function of manual white balance adjustment, the white balance adjustment may be freely adjustable.

Because an autonomously movable robot must move anywhere regardless of night and day, the influence of changes in ambient light must be minimized in order to improve accuracy of environment perception while using a camera of the type of visible light; therefore, a problem is encountered in that a white balance adjustment must be performed whenever the ambient light conditions change.

A further problem is encountered in that it is difficult for the operator to determine a timing at which the white balance adjustment must be performed.

A camera or an imaging device for solving the above problems is disclosed, for example, in Japanese Unexamined Patent Application, First Publication No. Hei 06-121321 (specifically, in FIGS. 2 and 3 thereof). In order to preferably perform a white balance adjustment without being influenced by the colors of a subject's clothing, an indoor wall, or the like, the imaging device is provided with a semitransparent lens cover, which is electrically opened or closed, in front of the lens thereof for taking images. The imaging device, first, takes images through the semitransparent lens cover when power is turned on or a command is input from outside, and takes further images after performing color correction and opening the semitransparent lens cover.

An electronic camera is also known from Japanese Unexamined Patent Application, First Publication No. Hei 10-4558 (specifically, in FIG. 1 thereof), which converts color tone under lighting for image taking into color tone under daylight, and which outputs images having color tone adjusted to the chromatic adaptation of human eyes.

However, because the imaging device disclosed in Japanese Unexamined Patent Application, First Publication No. Hei 06-121321 performs a white balance adjustment using the ambient light passed through the clouded semitransparent lens cover, the result of the white balance adjustment is determined by the chromatic transmission characteristics of the lens cover; therefore, the ambient light affects the result to some extent. Moreover, because the white balance adjustment is performed using transmitted light, the white balance adjustment is not necessarily performed under the same conditions as for practical environment perception. In other words, a problem is encountered in that an appropriate color correction cannot be performed by using the light transmitted through the lens cover because the ambient light reflected by objects must be taken as images for an autonomously movable robot to perceive the surrounding environment.

On the other hand, in the case of the electronic camera disclosed in Japanese Unexamined Patent Application, First Publication No. Hei 10-4558, because a white balance adjustment is performed so that the obtained images are naturally seen by human eyes, the resulting color correction may not be suitable for an autonomously movable robot to perceive the surrounding environment. When the autonomously movable robot perceives the surrounding environment, it is more important to maintain the perception results of the objects to be constant without having influence of the ambient light than to make the objects be naturally seen in terms of colors; therefore, a problem is encountered in that a white balance adjustment which is performed so that the obtained images are naturally seen by human eyes does not necessarily result in color correction which is suitable for surrounding environment perception.

SUMMARY OF THE INVENTION

In consideration of the above circumstances, objects of the present invention are to provide an imaging device for an autonomously movable body which can autonomously calibrate the imaging device, a calibration method for the imaging device, and a calibration program for the imaging device.

In order to solve the above problems and to achieve the above objects, the present invention provides an imaging device installed on an autonomously movable body which comprises an image-taking section for taking images of the surrounding environment, and an object detecting section for detecting objects and obstacles by processing the obtained images, the imaging device comprising: an image processing section to perform color detection of the images taken by the image-taking section; a white calibration plate for the image-taking section to perform color correction; and a calibration plate control section for moving the calibration plate into a field of view of the image-taking section, wherein it is determined whether color information which is sufficient to perform color detection is obtainable from the images taken by the image-taking section, and color correction is performed using the calibration plate when it is determined that the images taken by the image-taking section do not provide color information sufficient to perform color detection.

According to the present invention, because it is determined whether color information which is sufficient to perform color detection is obtainable from the images taken by the image-taking section (i.e., it is determined whether or not each intensity of RGB (red, green, and blue) of an expected object is within a predetermined range), and the calibration plate is moved into a field of view of the image-taking section so as to perform color correction when it is determined that the images taken by the image-taking section do not provide color information sufficient to perform color detection, an effect is obtained that an appropriate calibration of the imaging device can be effectively performed. Moreover, because the calibration plate is under ambient light, and color correction is performed using ambient light reflected by the surface of the calibration plate, color correction can be performed in substantially the same state as in a state in which surrounding environment perception is performed. As a result, because color correction is performed in a state in which the image-taking section is presently placed, the accuracy of color detection can be improved.

In another imaging device of the present invention, the color detection determination is performed depending on changes in the surrounding ambient light.

According to the above imaging device, because the color detection determination is performed depending on changes in the surrounding ambient light, an effect is obtained that an appropriate calibration of the imaging device can be effectively performed upon changes in the surrounding ambient light.

In another imaging device of the present invention, the color detection determination is performed depending on the present position of the autonomously movable body in a map defining a movable area of the autonomously movable body, or based on time.

According to the above imaging device, because the color detection determination is performed depending on the present position of the autonomously movable body in a map defining a movable area of the autonomously movable body, or based on time, an effect is obtained that an appropriate calibration of the imaging device can be effectively performed at positions or times determined in advance.

In another imaging device of the present invention, the color detection determination is performed in accordance with commands sent from an operator.

According to the above imaging device, because the color detection determination is performed in accordance with commands sent from an operator, an effect is obtained that a calibration of the imaging device can be effectively performed at a freely selected time.

In another imaging device of the present invention, the color detection determination is performed depending on whether or not the image processing section can perform color detection.

According to the above imaging device, because it is determined whether or not the image processing section can perform color detection, and color correction is performed in accordance with the result of the color detection determination, an effect is obtained that an appropriate calibration of the imaging device can be effectively performed. The imaging device of the present invention may further comprise: a memory section for storing information in advance about times or positions at which the image-taking section performs color correction; and a control section which makes the calibration plate control section move the calibration plate, and which sends a command to the image-taking section to perform color correction in accordance with the information about times or positions stored in the memory section.

According to the above imaging device, because the white calibration plate, which is used to perform color correction by the image-taking section, is moved into a field of view of the image-taking section, and color correction is performed, when the calibration plate is in the field of view of the image-taking section, in accordance with the information about times or positions stored in the memory section, i.e., color correction is performed when the predetermined positions or times are reached, an effect is obtained that a calibration of the imaging device can be effectively performed in accordance with the changes in environment.

The imaging device of the present invention may further comprise: a voice recognition section which recognizes a command voice picked up by a microphone, and which outputs voice recognition results; and a control section which makes the calibration plate control section move the calibration plate while making the image-taking section perform color correction when the voice perception results obtained by the voice recognition section are a command for the image-taking section to perform color correction.

According to the above imaging device, the voice recognition section recognizes a command voice picked up by a microphone, and when the voice recognition results are a command for the image-taking section to perform color correction, the white calibration plate, which is used to perform color correction by the image-taking section, is moved into a field of view of the image-taking section, and color correction is performed when the calibration plate is in the field of view of the image-taking section, i.e., color correction is performed in accordance with the command from outside; therefore, an effect is obtained that a calibration of the imaging device can be effectively performed at a freely selected time.

The imaging device of the present invention may further comprise: a command recognition section which recognizes human motion in the images taken by the image-taking section, and which outputs recognition results; and a control section which makes the calibration plate control section move the calibration plate while making the image-taking section perform color correction when the recognition results obtained by the command recognition section are a command for the image-taking section to perform calibration.

According to the above imaging device, the command recognition section recognizes human motion or gesture in the images taken by the image-taking section, and when the recognition results are a command for the image-taking section to perform calibration, the white calibration plate, which is used to perform color correction by the image-taking section, is moved into a field of view of the image-taking section, and color correction is performed when the calibration plate is in the field of view of the image-taking section, i.e., color correction is performed in accordance with the command from outside; therefore, an effect is obtained that a calibration of the imaging device can be effectively performed at a freely selected time.

In the imaging device of the present invention, the autonomously movable body may be a bipedal humanoid robot, and the calibration plate may be installed on an arm of the humanoid robot.

According to the above imaging device, because the calibration plate is installed on an arm of the humanoid robot, an effect is obtained that the field of view of the image-taking section can be covered by the calibration plate at a freely selected position and at a freely selected time.

In the imaging device of the present invention, the autonomously movable body may be a bipedal humanoid robot, and the calibration plate may be carried by the humanoid robot.

According to the above imaging device, because the calibration plate is carried by the humanoid robot, an effect is obtained that the field of view of the image-taking section can be covered by the calibration plate at a freely selected position and at a freely selected time.

The present invention further provides a calibration method for an imaging device installed on an autonomously movable body which comprises an image-taking section for taking images of the surrounding environment, and an object detecting section for detecting objects and obstacles by processing the obtained images, the calibration method comprising the steps of: processing images for detecting colors in the images taken by the image-taking section; determining whether color information which is sufficient to perform color detection is obtainable from the images taken by the image-taking section; controlling a white calibration plate, which is used for color correction by the image-taking section, so that the calibration plate moves into a field of view of the image-taking section when it is determined that the images taken by the image-taking section do not provide color information sufficient to perform color detection; and performing color correction when the calibration plate is in the field of view of the image-taking section.

According to the above calibration method for an imaging device installed on an autonomously movable body, the calibration plate, which is used for color correction by the image-taking section, is moved into a field of view of the image-taking section when color detection cannot be performed, and color correction is performed when the calibration plate is in the field of view of the image-taking section, i.e., color correction is performed in accordance with the result of the color detection determination; therefore, an effect is obtained that an appropriate calibration of the imaging device can be effectively performed.

The present invention further provides a calibration method for an imaging device installed on an autonomously movable body which comprises an image-taking section for taking images of the surrounding environment, and an object detecting section for detecting objects and obstacles by processing the obtained images, the calibration method comprising the steps of: storing information about times or positions at which the image-taking section performs color correction; controlling a white calibration plate, which is used for color correction by the image-taking section, in accordance with the information about times or positions stored in the storing step so that the calibration plate moves into a field of view of the image-taking section; and performing color correction when the calibration plate is in the field of view of the image-taking section.

According to the above calibration method, the calibration plates which is used for color correction by the image-taking section, is moved into a field of view of the image-taking section in accordance with the information about times or positions stored, and color correction is performed when the calibration plate is in the field of view of the image-taking section, i.e., color correction is performed when the predetermined position or time is reached; therefore, an effect is obtained that a calibration of the imaging device can be effectively performed in accordance with the changes in environment.

The present invention further provides a calibration program for an imaging device installed on an autonomously movable body which comprises an image-taking section for taking images of the surrounding environment, and an object detecting section for detecting objects and obstacles by processing the obtained images, the calibration program makes a computer execute the processes of: processing images for detecting colors in the images taken by the image-taking section; determining whether color information which is sufficient to perform color detection is obtainable from the images taken by the image-taking section; controlling a white calibration plate, which is used for color correction by the image-taking section, so that the calibration plate moves into a field of view of the image-taking section when it is determined that the images taken by the image-taking section do not provide color information sufficient to perform color detection; and performing color correction when the calibration plate is in the field of view of the image-taking section.

According to the above calibration program for an imaging device installed on an autonomously movable body, the calibration plate, which is used for color correction by the image-taking section, is moved into a field of view of the image-taking section when color detection cannot be performed, and color correction is performed when the calibration plate is in the field of view of the image-taking section, i.e., color correction is performed in accordance with the result of the color detection determination; therefore, an effect is obtained that an appropriate calibration of the imaging device can be effectively performed.

The present invention further provides a calibration program for an imaging device installed on an autonomously movable body which comprises an image-taking section for taking images of the surrounding environment, and an object detecting section for detecting objects and obstacles by processing the obtained images, the calibration program makes a computer execute the processes of: storing information about times or positions at which the image-taking section performs color correction; controlling a white calibration plate, which is used for color correction by the image-taking section, in accordance with the information about times or positions stored in the storing step so that the calibration plate moves into a field of view of the image-taking section; and performing color correction when the calibration plate is in the field of view of the image-taking section.

According to the above calibration program, the calibration plate, which is used for color correction by the image-taking section, is moved into a field of view of the image-taking section in accordance with the information about times or positions stored, and color correction is performed when the calibration plate is in the field of view of the image-taking section, i.e., color correction is performed in accordance with the result of the color detection determination; therefore, an effect is obtained that a calibration of the imaging device can be effectively performed in accordance with the changes in environment.

DESCRIPTION OF THE PREFERRED EMBODIMENTS

Figure 1:
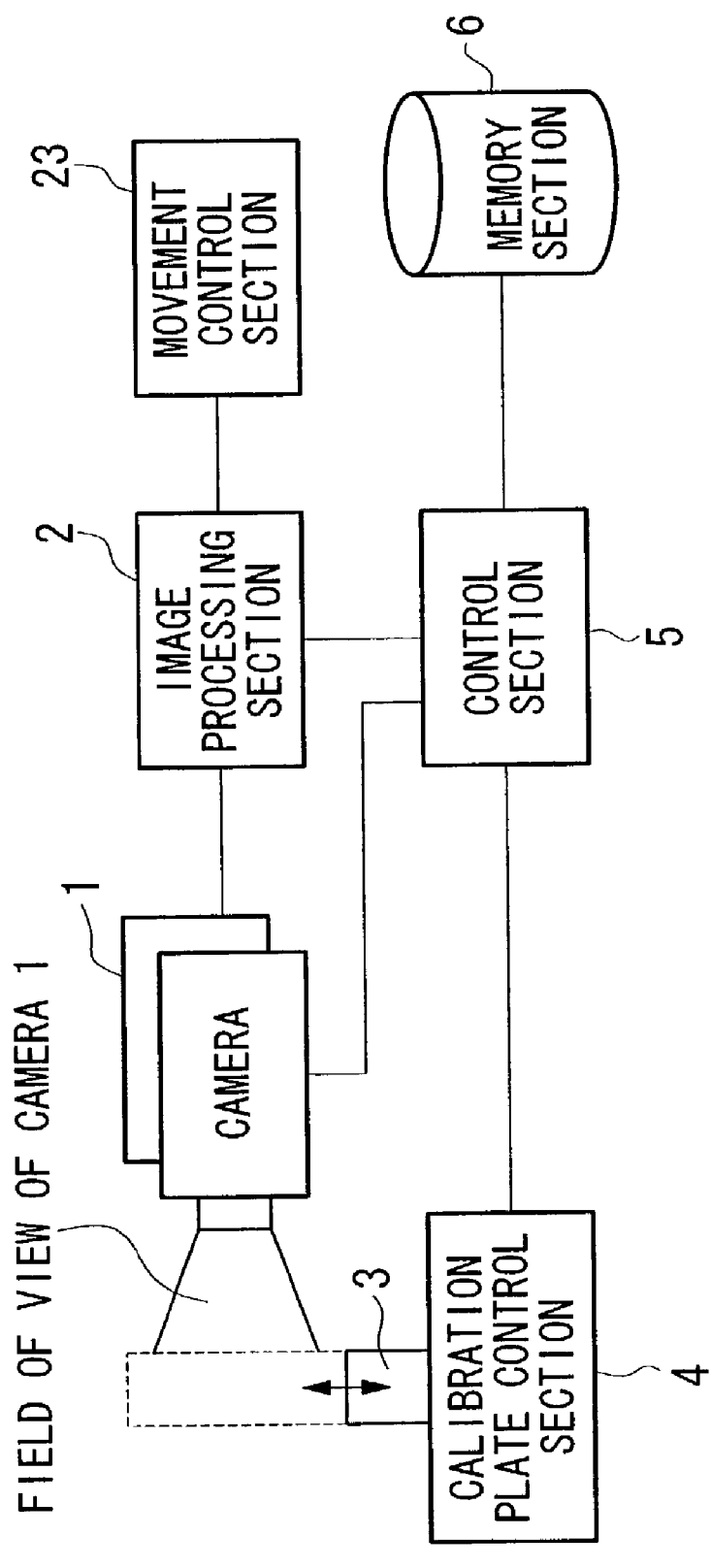
FIG. 1 is a block diagram showing a first embodiment of the present invention.

An imaging device for an autonomously movable body according to the first embodiment of the present invention will be explained below with reference to the appended drawings. FIG. 1 is a block diagram showing the structure of the first embodiment of the present invention. In FIG. 1, reference symbol 1 indicates a stereo camera (hereinafter simply referred to as a camera) which comprises two color CCD cameras, and which can perform a white balance adjustment based on signals sent from outside. Reference symbol 2 indicates an image processing section which processes images obtained by applying sampling and quantifying processes to images taken by the camera 1, whereby perceives the surrounding environment for the movable body to autonomously move. Reference symbol 3 indicates a calibration plate which covers a field of view of the camera 1 when a white balance adjustment is performed, and which is preferably a perfect reflecting diffuser plate which is white; however, which may be a plate coated with white matte paint. Reference symbol 4 indicates a calibration plate control section which controls the position of the calibration plate 3 so that calibration plate 3 covers the field of view of the camera 1. Reference symbol 5 indicates a control section which performs a white balance adjustment for the camera 1. Reference symbol 6 indicates a memory section in which necessary information for performing a white balance adjustment is stored. Reference symbol 23 indicates a movement control section which controls autonomous movement of the movable body, on which the imaging device for an autonomously movable body is installed, based on information about the surrounding environment obtained by the image processing section 2.

Next, the operation of the device shown in FIG. 1 will be explained. First, the operation for controlling the movable body will be briefly explained. At the beginning, the camera 1 (two CCD cameras) takes images of the surrounding environment, and sends the obtained images to the image processing section 2. Upon receiving the images, the image processing section 2 applies image processing to the received images, extracts the shape of objects, measures distances to the objects using stereo images, and sends the results to the movement control section 23. The movement control section 23 finds a moving path for the movable body based on the information about the shape of the objects and distances to the objects sent from the image processing section 2, and makes the movable body move autonomously. By repeating these operations, the movable body can autonomously move.

Figure 2:
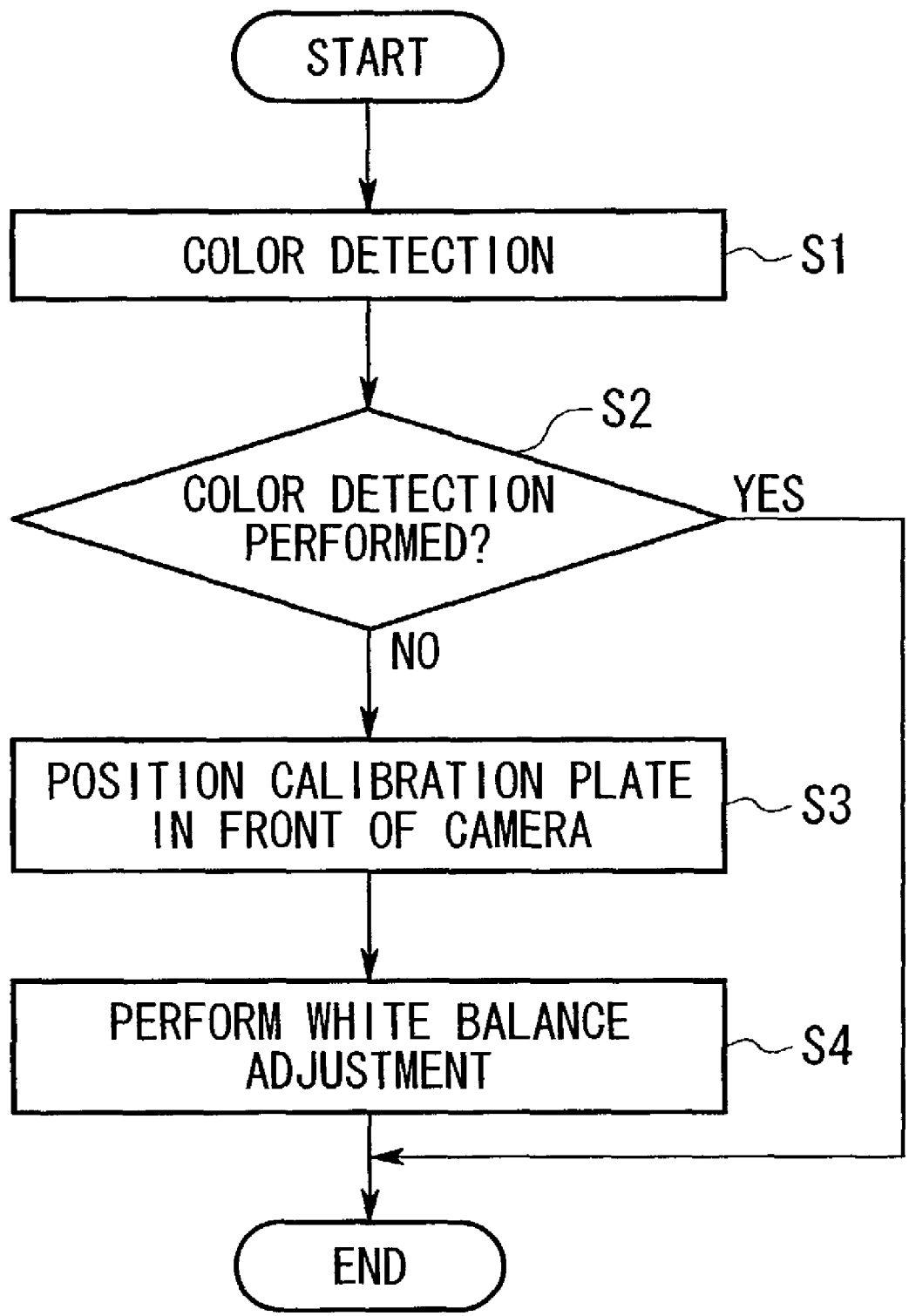
FIG. 2 is a flowchart showing the operation of the device shown in FIG. 1.

Next, the operation for performing a white balance adjustment for the camera 1 by the movable body while the movable body autonomously moves will be explained with reference to FIG. 2. FIG. 2 is a flowchart showing the operation for performing a white balance adjustment for the camera 1. First, the image processing section 2 tries to perform color detection on the images taken by the camera 1 (step S1). The image processing section 2 determines whether or not color detection could be performed (step S2). The result is determined by whether or not each intensity of RGB (red, green, and blue) of an expected object is within a predetermined range.

When the result of the determination indicates that color detection could be performed, the image processing section 2 sends information that color detection was performed to the control section 5. Upon receiving the information, the control section 5 maintains the present state. In contrast, when the result of the determination indicates that color detection could not be performed, the image processing section 2 sends information that color detection was not performed to the control section 5. Upon receiving the information, the control section 5 sends a command to the calibration plate control section 4 so that the calibration plate 3 is moved to a position in front of the camera 1. At this time, the control section 5 reads out the relative positioning between the camera 1 and calibration plate 3 stored in the memory section 6, finds the amount of movement of the calibration plate 3, and sends information about the amount of movement to the calibration plate control section 4. Upon receiving the information, the calibration plate control section 4 makes the calibration plate 3 move to a position in front of the camera 1 (step S3). As a result, the calibration plate 3 covers the field of view of the camera 1 (two CCD cameras).

Next, the control section 5 sends a command to the camera 1 so as to perform a white balance adjustment. Upon receiving the command, the camera 1 performs a white balance adjustment while the calibration plate 3 covers the field of view (step S4). As a result, a white balance adjustment is performed, and color detection can now be performed; therefore, appropriate surrounding environment perception can be performed. In particular, because the calibration plate 3 is positioned so as to have a predetermined distance from the camera 1 in order to expose the calibration plate 3 to ambient light, and because the entire field of view of the camera 1 is covered by the calibration plate 3 so that a white balance adjustment is performed using the ambient light reflected by the surface of the calibration plate 3, a white balance adjustment can be performed in substantially the same state as in a state in which surrounding environment perception is performed. As a result, because a white balance adjustment is performed under the present state, the accuracy of color detection can be improved.

Figure 10:
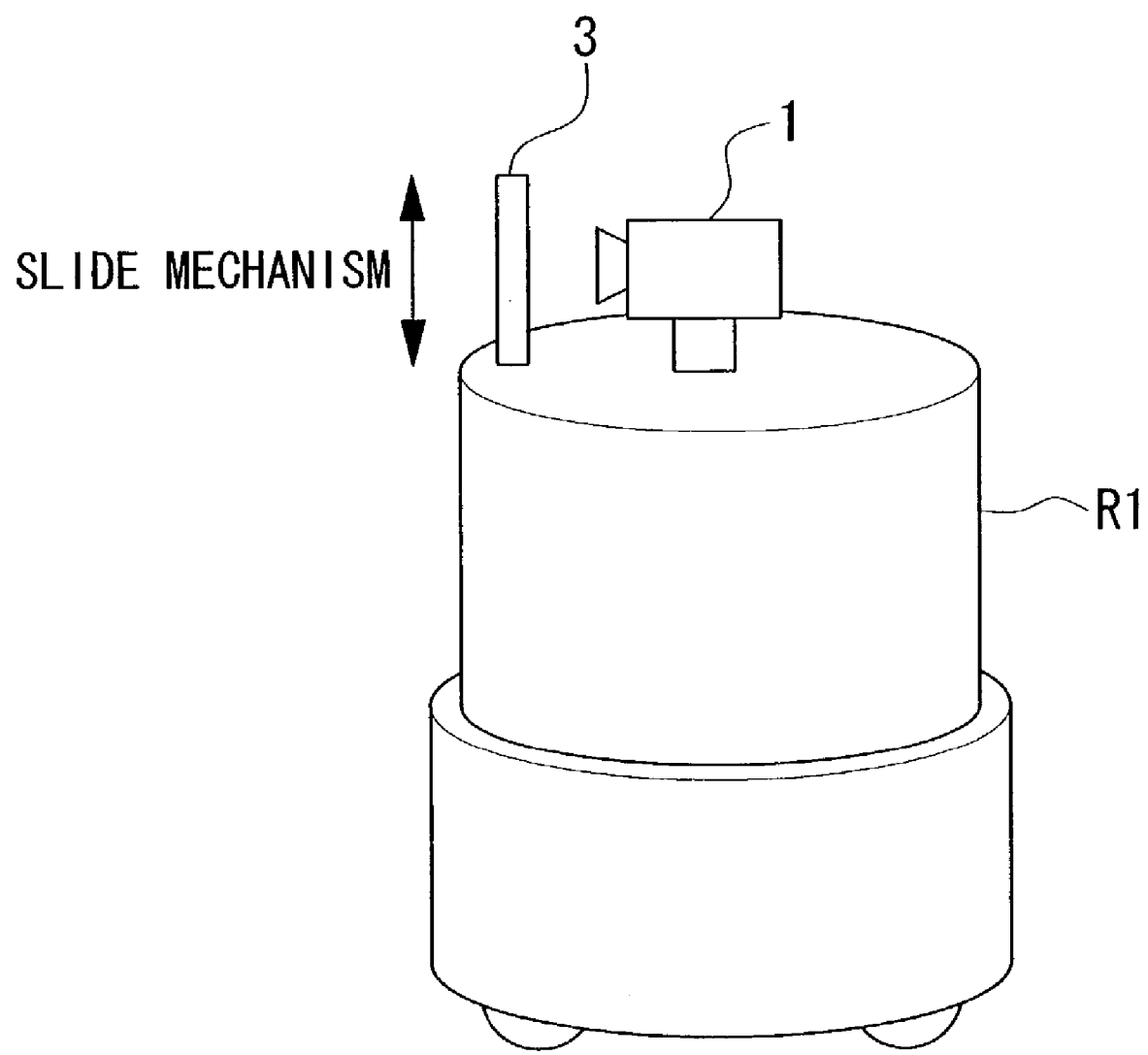
FIG. 10 is an explanatory diagram showing an example of a movable body.

Next, a more specific example of the operation for performing a white balance adjustment will be explained with reference to FIGS. 10 to 13. In FIG. 10, reference symbol R1 indicates a box-shaped autonomously movable robot on which the imaging device for an autonomously movable body is installed. The autonomously movable robot R1 determines a moving path based on the images taken by the camera 1, and moves autonomously. When it is determined that color detection cannot be performed during autonomous movement, the autonomously movable robot R1 moves the calibration plate 3 so as to cover the field of view of the camera 1, and performs a white balance adjustment.

Figure 11:
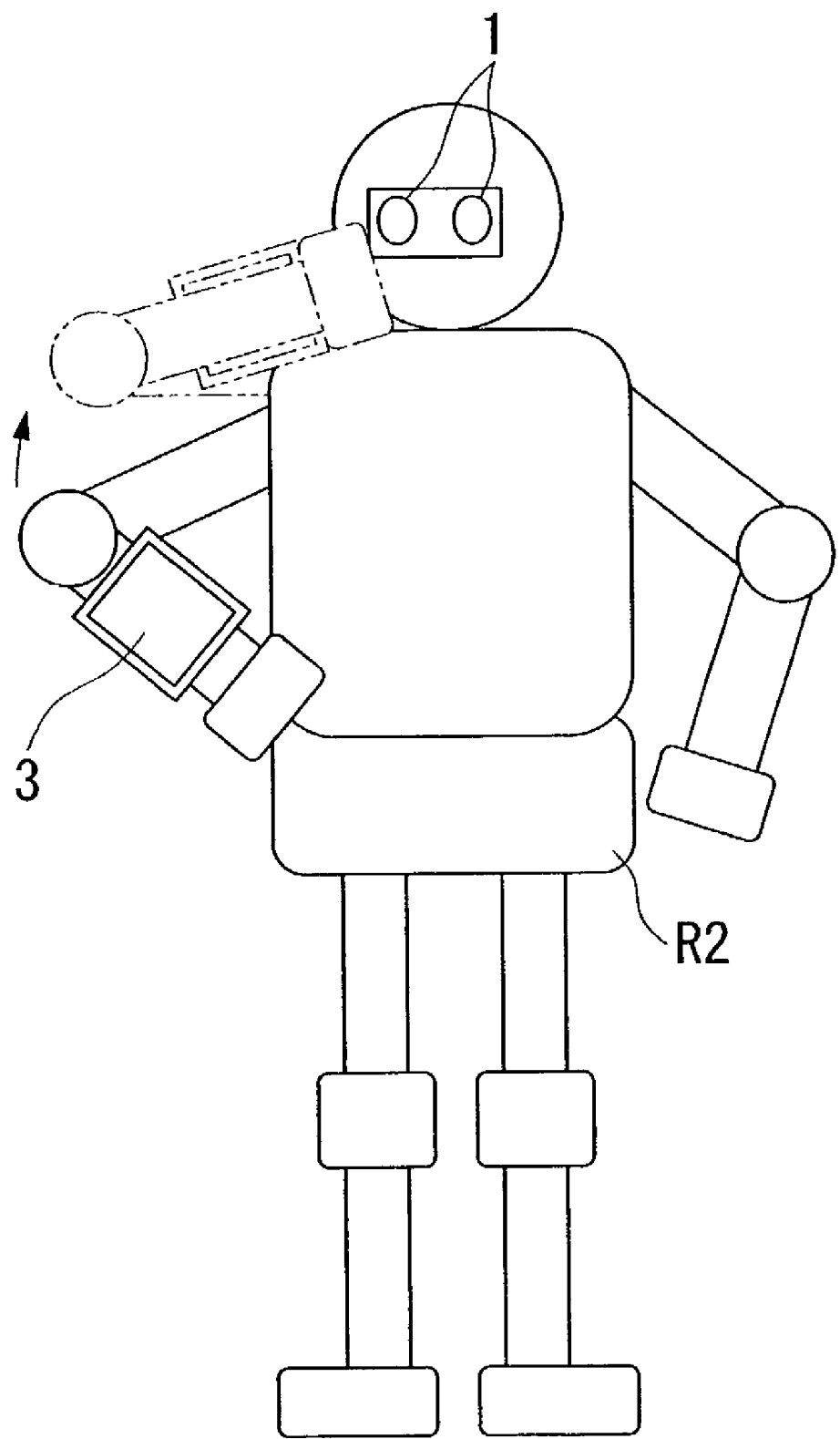
FIG. 11 is an explanatory diagram showing an example of motion of a movable body.
Figure 12:
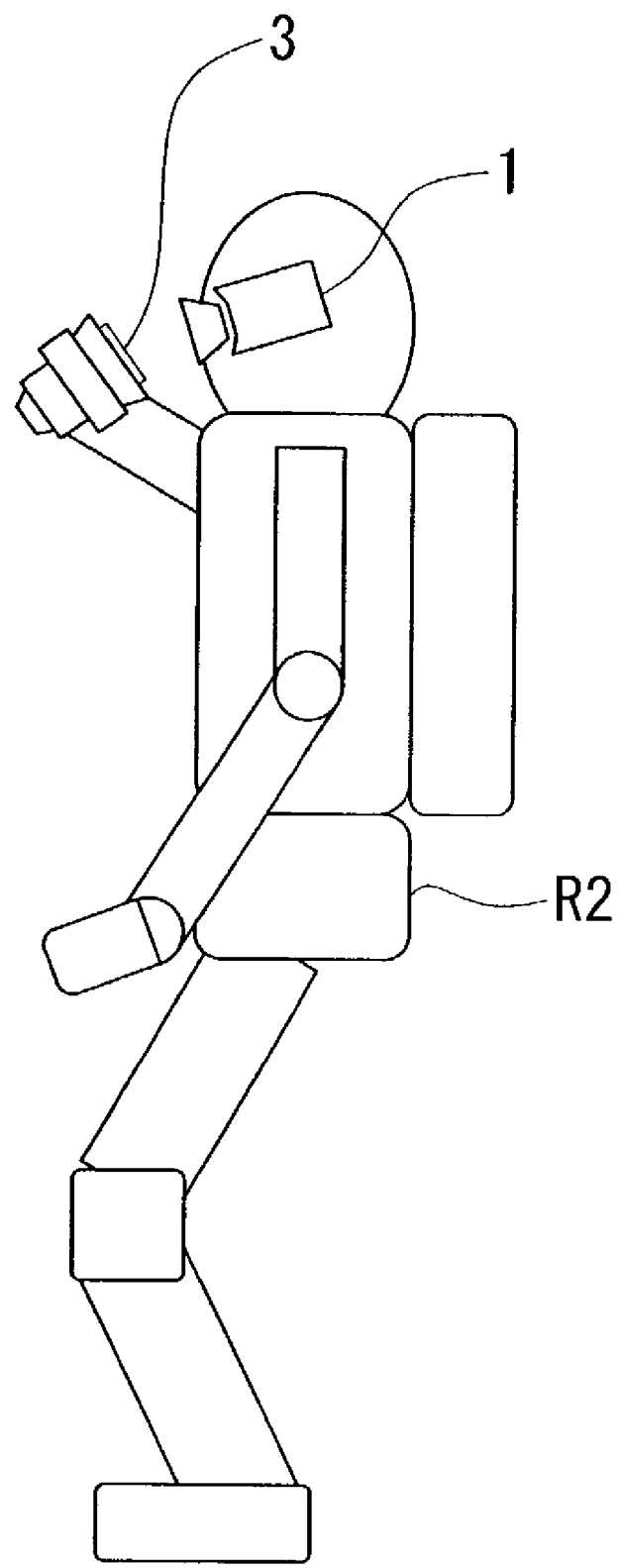
FIG. 12 is another view of the movable body shown in FIG. 11.

In FIG. 11, reference symbol R2 indicates an autonomously movable bipedal humanoid robot. In this example, the calibration plate 3 is installed on an arm (between the wrist and elbow) of the autonomously movable humanoid robot R2, and the portion of the arm at which the calibration plate 3 is installed is moved into the field of view of the camera 1 (the position indicated by two-dot chain lines in FIG. 11). The calibration plate control section 4 controls the arm of the autonomously movable humanoid robot R2 so that the calibration plate 3 is positioned in front of the camera 1 (see FIG. 12) upon receiving a command for moving the calibration plate 3 from the control section 5 when a white balance adjustment is required. In this case, the calibration plate 3 may be installed on the arm as shown in FIGS. 11 and 12; however, the arm of the autonomously movable humanoid robot R2 may have a planar portion, and the planar portion may be coated with white matte paint so as to function as a calibration plate. Note that the area to be coated with white paint is preferably a plane; however, the area may be a curved surface provided that shadow is not formed in the images during white balance adjustment. Moreover, a portion of the arm of the autonomously movable humanoid robot R2 may form the calibration plate 3. Furthermore, the calibration plate 3 may be installed in/on the head of the autonomously movable humanoid robot R2 along with a sliding mechanism, and the calibration plate 3 may be slid when a white balance adjustment is required.

Figure 13:
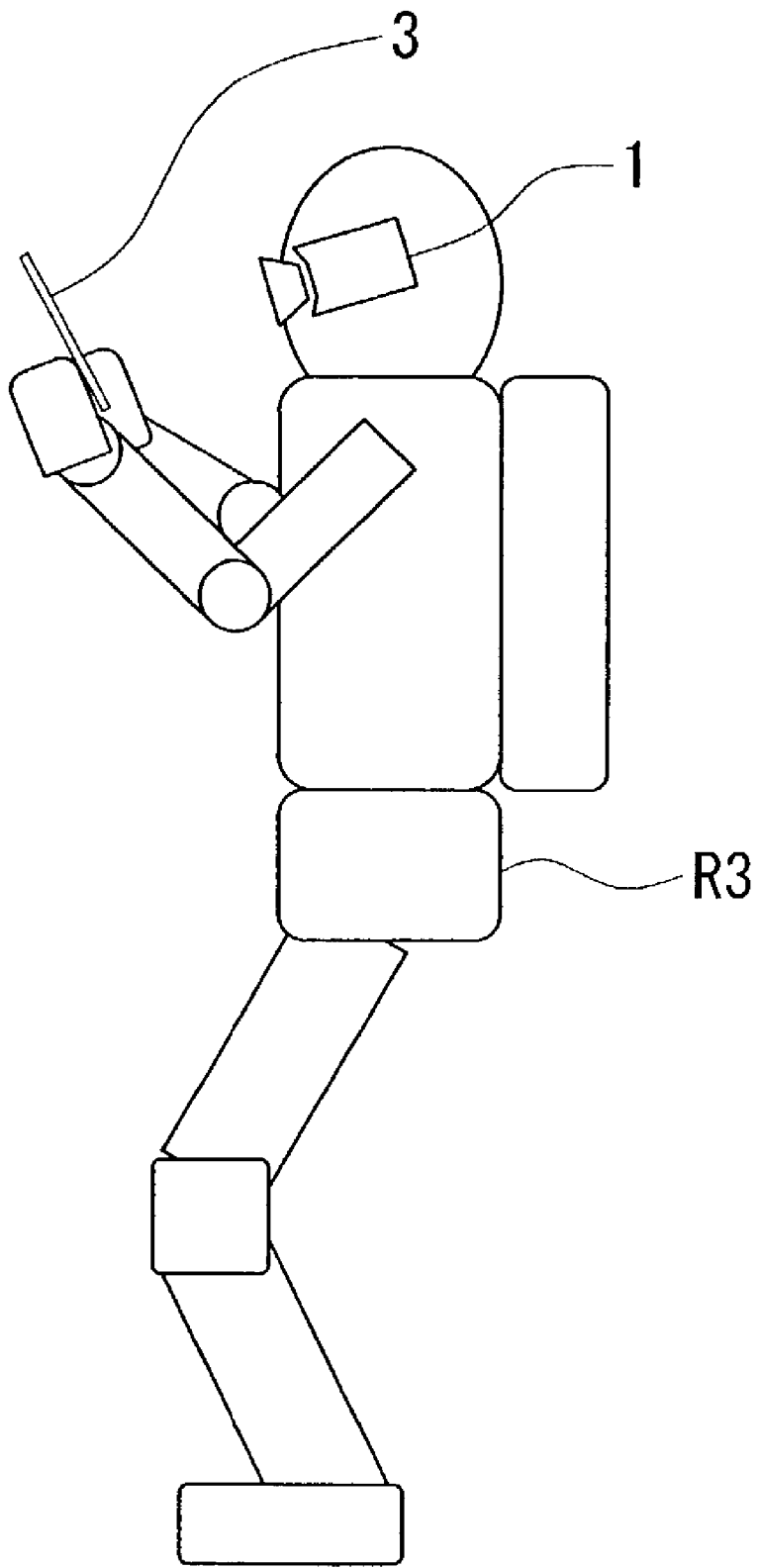
FIG. 13 is an explanatory diagram showing another example of a movable body.

In FIG. 13, reference symbol R3 indicates another autonomously movable bipedal humanoid robot which carries the calibration plate 3. In this example, the calibration plate 3 is taken out when a white balance adjustment is required, and the calibration plate 3 is positioned in front of the camera 1. The calibration plate 3 may be equipped anywhere on or in the autonomously movable humanoid robot R3 in a detachable manner provided that the calibration plate 3 will not be an obstacle for predetermined motions of the autonomously movable humanoid robot R3. For example, the calibration plate 3 may be equipped on the upper arm (between the shoulder and elbow), abdomen, waist, hip, back, leg, or the like, and the calibration plate 3 may be removed by the hand of the autonomously movable humanoid robot R3 when a white balance adjustment is required. The calibration plate 3 may be returned to the original place after a white balance adjustment is performed. By providing the calibration plate 3 in such a manner, the calibration plate 3 can be easily replaced with a new one when the calibration plate 3 has degraded.

As explained above, because the autonomously movable robot R1, R2, or R3 is equipped with the calibration plate 3, and the calibration plate 3 is positioned in front of the camera 1 when a white balance adjustment is required so that a white balance adjustment is performed while the autonomously movable robot R1, R2, or R3 is moving, an appropriate color correction can be performed even when the surrounding environment changes rapidly, and an appropriate surrounding environment perception can be achieved.

Figure 3:
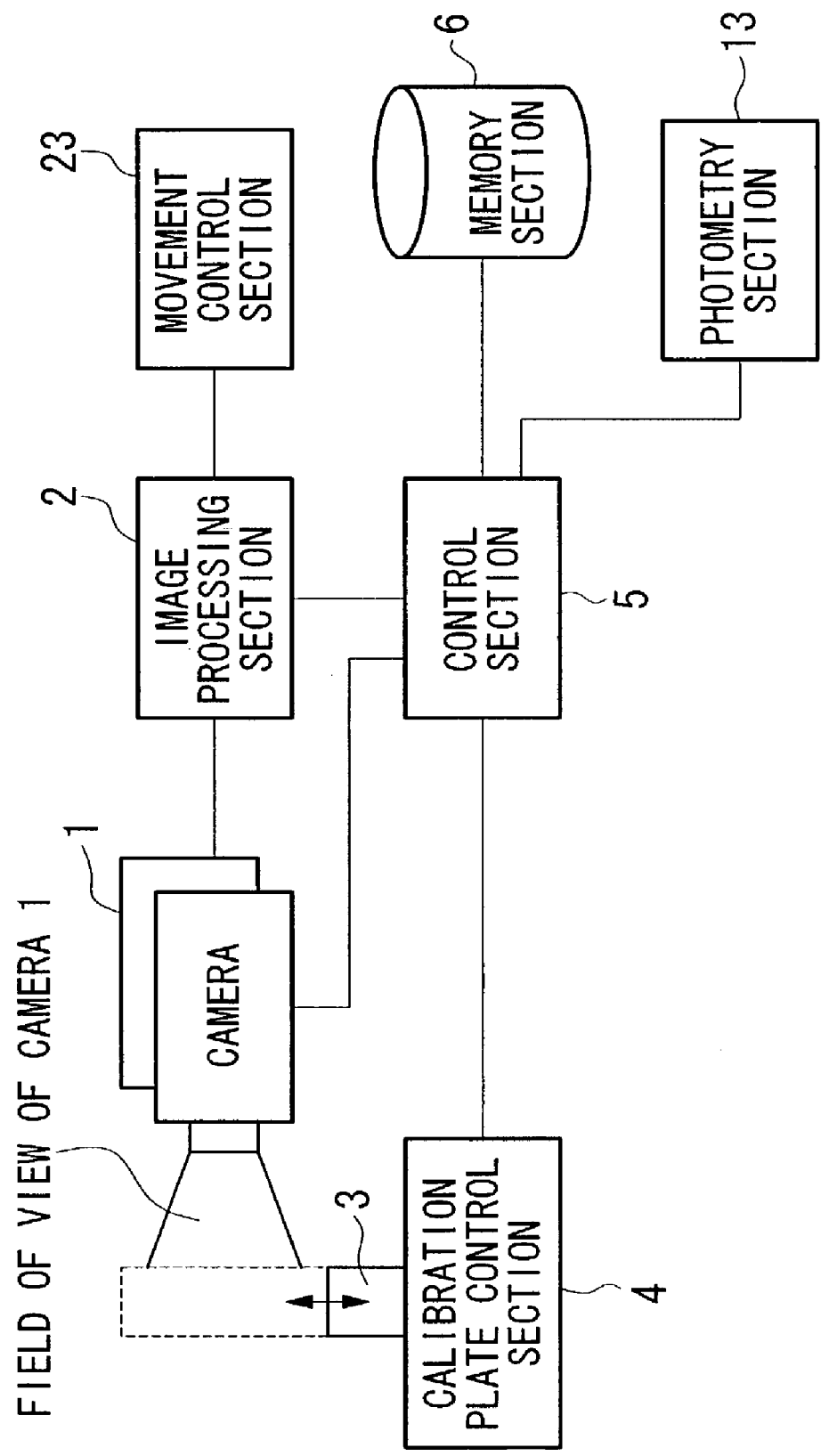
FIG. 3 is a block diagram showing a second embodiment of the present invention.

Next, the imaging device for an autonomously movable body according to the second embodiment of the present invention will be explained below with reference to the appended drawings. FIG. 3 is a block diagram showing the structure of the second embodiment of the present invention. In FIG. 3, the same reference symbols are applied to the same elements as in the first embodiment shown in FIG. 1, and explanations thereof will be omitted. The imaging device shown in FIG. 3 differs from the first embodiment in that a photometry section 13 is further provided, which measures the intensity of the ambient light along with color information thereof, and which performs the color detection process (step S1) and the determination process as to whether color detection could be performed (step S2) instead of the image processing section 2. The photometry section 13 measures the surrounding ambient light at predetermined intervals (e.g., 3 minutes), compares the present measurement result with the measurement result in the immediately previous white balance adjustment, and if difference therebetween is found, the photometry section 13 deems that the surrounding ambient light has been changed, determines that color detection cannot be appropriately performed, and sends the determination results to the control section 5. The result is determined by whether or not each intensity of RGB of an expected object is within a predetermined range as in the first embodiment.

The detailed description of the subsequent operations after this determination will be omitted here since these operations are the same as steps S3 and S4 in the first embodiment.

Figure 4:
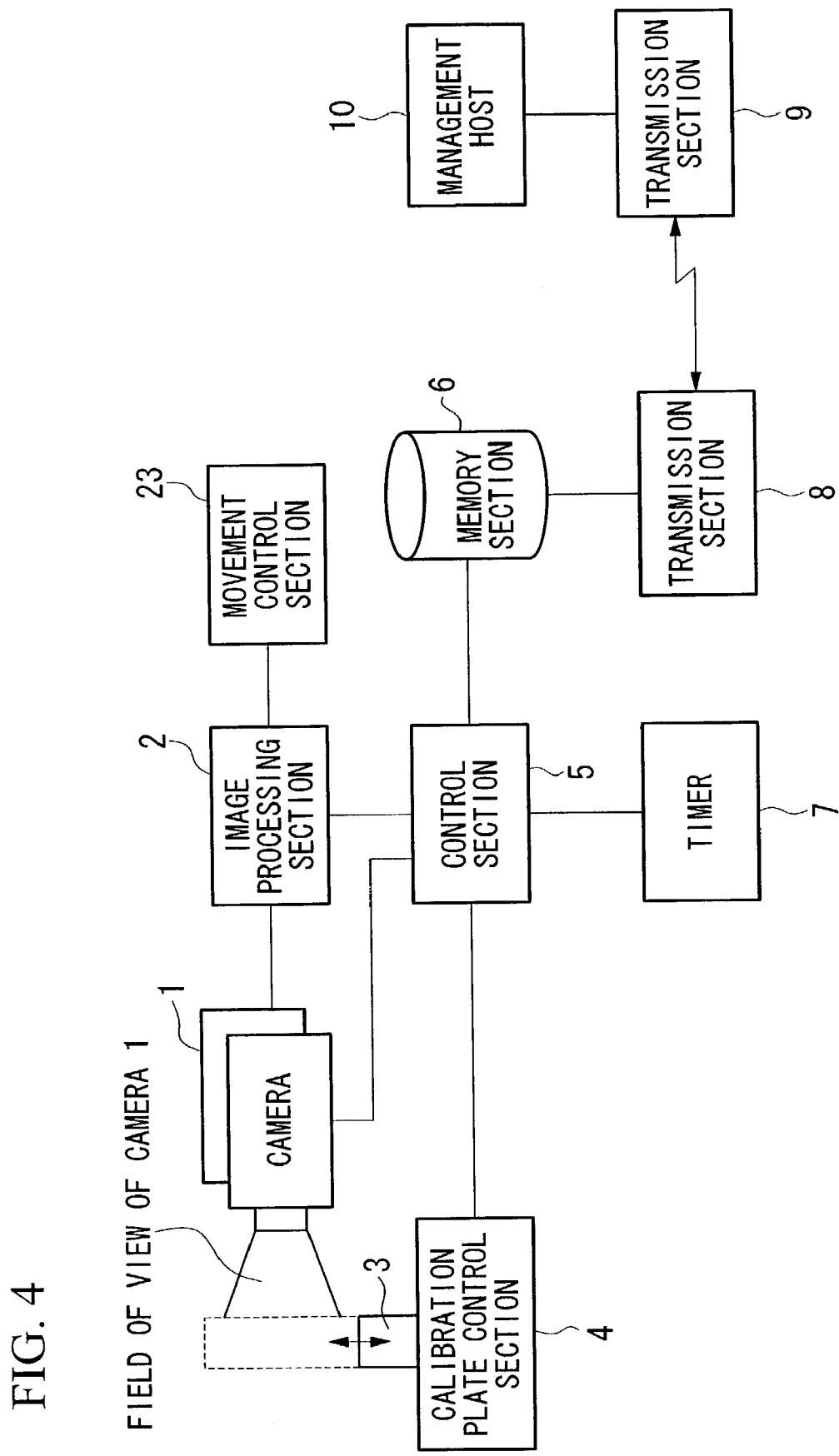
FIG. 4 is a block diagram showing a third embodiment of the present invention.

Next, the imaging device for an autonomously movable body according to the third embodiment of the present invention will be explained below with reference to the appended drawings. FIG. 4 is a block diagram showing the structure of the third embodiment of the present invention. In FIG. 4, the same reference symbols are applied to the same elements as in the first embodiment shown in FIG. 1, and explanations thereof will be omitted. The imaging device shown in FIG. 4 differs from the first embodiment in that a timer 7, communication sections 8 and 9, and management host 10 are further provided. The timer 7 informs the control section 5 of the present time. The communication section 8 performs communication using a radio device provided in the movable body. The communication section 9 sends information output from the management host 10 to the communication section 8 using a radio communication system. The communication section 9 is positioned so as to be able to perform radio communication with the communication section 8.

Next, the operation of the imaging device for an autonomously movable body shown in FIG. 4 will be explained with reference to FIG. 5. First, the management host 10 sends information about a white balance adjustment for the camera 1 to the communication section 8 via the communication section 9. The information about a white balance adjustment herein referred to includes conditions required for performing a white balance adjustment, and more specifically includes map information within the movable area of the movable body and information about position in the map and time at which a white balance adjustment is performed.

Then, the communication section 8 downloads the information sent from the management host 10 to the memory section 6 (step S11). Next, the control section 5 reads out the conditions stored on the memory section 6 (step S12). The conditions read out from the memory section 6 includes the map information within the movable area of the movable body and the information about position in the map and time at which a white balance adjustment is to be performed.

Next, the control section 5 compares the surrounding environment perception information output from the image processing section 2 with the map information read out from the memory section 6 so to specify the present position of the movable body in the map, and the control section 5 also receives output of the timer 7. Then, the control section 5 determines whether or not the conditions for performing a white balance adjustment are satisfied (step S13). More specifically, the control section 5 determines whether or not the present time coincides with the stored time, and the present position coincides with the stored position, and deems that the conditions are satisfied when either one of time and position conditions is satisfied, or both the conditions are satisfied.

As a result of the above determination, when the conditions are not satisfied, the control section 5 waits until the conditions are satisfied. In contrast, when the conditions are satisfied, the control section 5 sends a command to the calibration plate control section 4 so as to move the calibration plate 3 to a position in front of the camera 1. At this time, the control section 5 reads out relative positioning between the camera 1 and calibration plate 3 stored in the memory section 6, finds the amount of movement of the calibration plate 3, and sends information about the amount of movement to the calibration plate control section 4. Upon receiving the information, the calibration plate control section 4 makes the calibration plate 3 move to a position in front of the camera 1 (step S14). As a result, the calibration plate 3 covers the field of view of the camera 1 (two CCD cameras).

Next, the control section 5 sends a command to the camera 1 so as to perform a white balance adjustment. Upon receiving the command, the camera 1 performs a white balance adjustment while the calibration plate 3 covers the field of view (step S15). As a result, a white balance adjustment is performed, and appropriate surrounding environment perception can be performed.

Figure 6A:
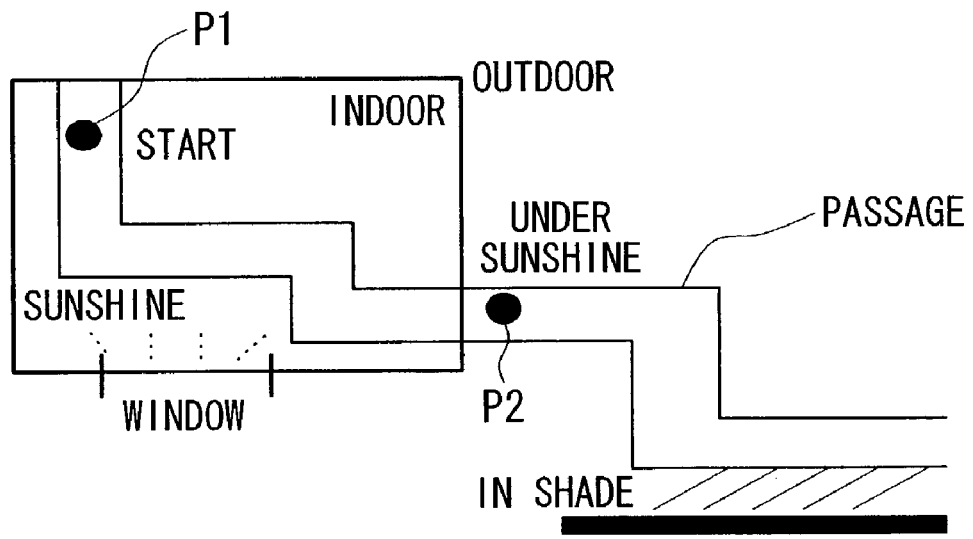
FIGS. 6A and 6B are explanatory diagrams showing timings at which a white balance adjustment is performed.
Figure 6B:
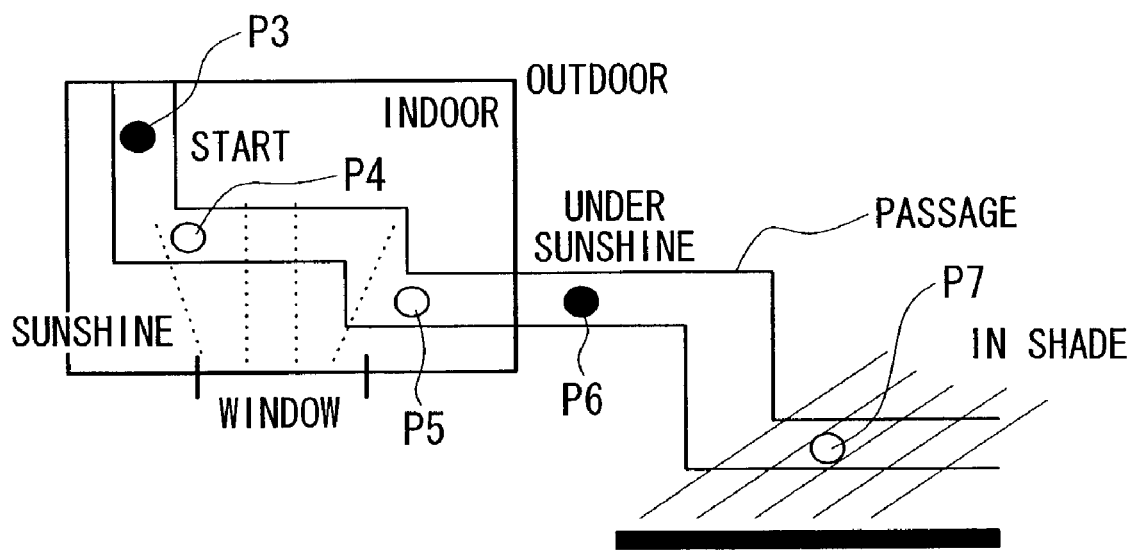

Now, a specific example of the operation for performing a white balance adjustment at the time and position specified by the management host 10 will be explained with reference to FIGS. 6A, 6B, and 7. FIGS. 6A and 6B show that the timings at which a white balance adjustment is performed are differently set depending on sunshine. FIG. 6A shows a situation in which the sun is at a high position, and FIG. 6B shows a situation in which the sun is at a low position. In FIGS. 6A and 6B, the positions at which a white balance adjustment must be performed are indicated by filled circles (•), and the positions at which a white balance adjustment is performed depending on time are indicated by unfilled circles (o).

As shown in FIG. 6A, when the sun is at a high position, because the area having sunshine through windows is small, a white balance adjustment is performed at position P1, and a white balance adjustment is not performed at other positions when the movable body moves along the indoor passage. Then, a mandatory white balance adjustment is performed at position P2 at which the movable body moves outdoors.

In contrast, as shown in FIG. 6B, when the sun is at a low position, because the area having sunshine through windows is large, a white balance adjustment is performed at position P3, and then the present time is checked at position P4, and if the present time indicates that the sun should be at a low position; then, another white balance adjustment is performed at position P4. At position P5 not having sunshine, a white balance adjustment is performed depending on whether or not a white balance adjustment has been performed at position P4. A mandatory white balance adjustment is performed at position P6 because the movable body moves outdoors at this position. Furthermore, at position P7 which is in the shade when the sun is at a low position, a white balance adjustment is performed provided that the present time indicates that the sun should be at a low position.

Figure 7:
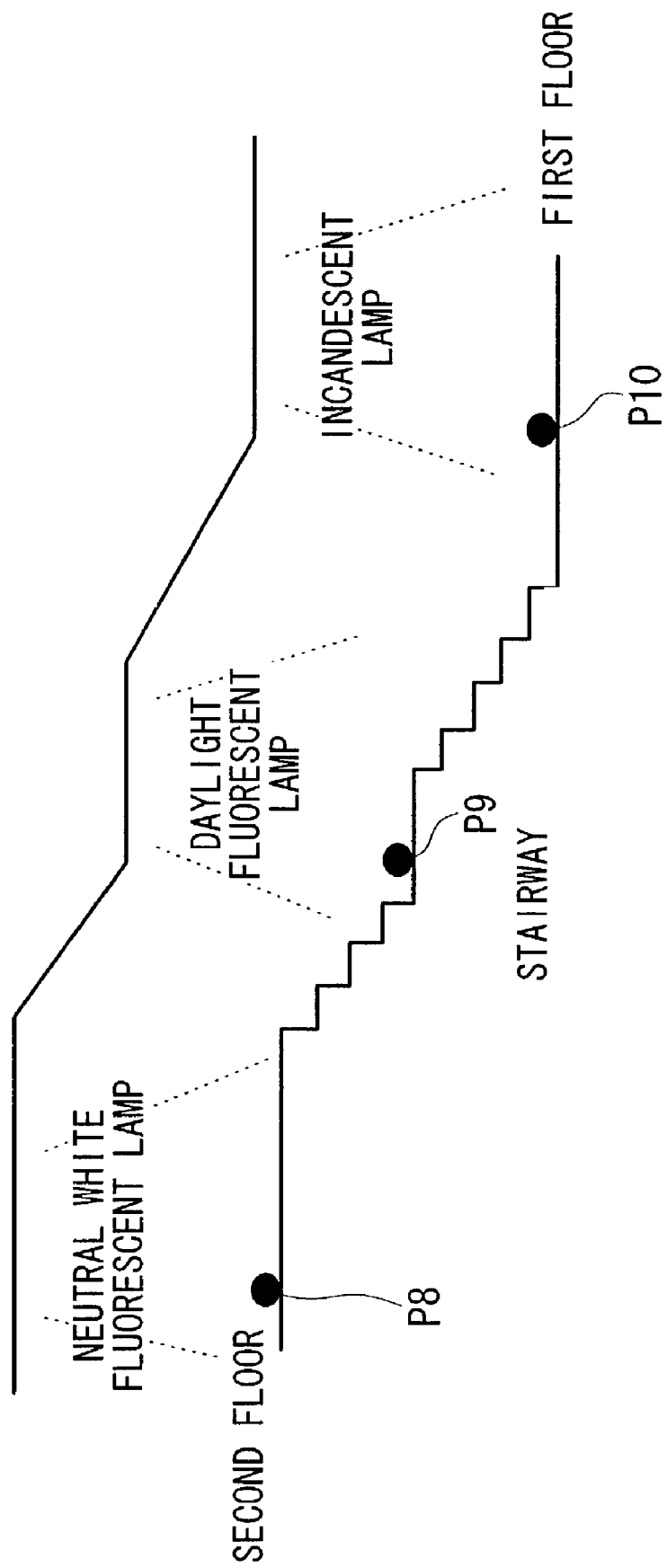
FIG. 7 is an explanatory diagram showing timings at which a white balance adjustment is performed.

FIG. 7 shows a situation in which a white balance adjustment is appropriately performed in accordance with various types of lighting. In general, when lighting is provided inside of a building, the colors of the lighting are often selected depending on the purposes of the places. In an exemplary case shown in FIG. 7, a neutral white fluorescent lamp is used for the second floor, a daylight fluorescent lamp is used for the stairway, and an incandescent lamp is used for the first floor. The control section 5 refers to the map information, and executes a white balance adjustment when the movable body reaches each of the positions (positions P8, P9, and P10) at which one of the lighting fixtures mostly affects the images, i.e., at a position directly under each of the lighting fixtures.

As explained above, because the map information within the movable area of the movable body and the information about position in the map and time at which a white balance adjustment is to be performed are downloaded, and a white balance adjustment is performed based on the obtained information, an appropriate white balance adjustment is reliably performed in accordance with the position.

Figure 8:
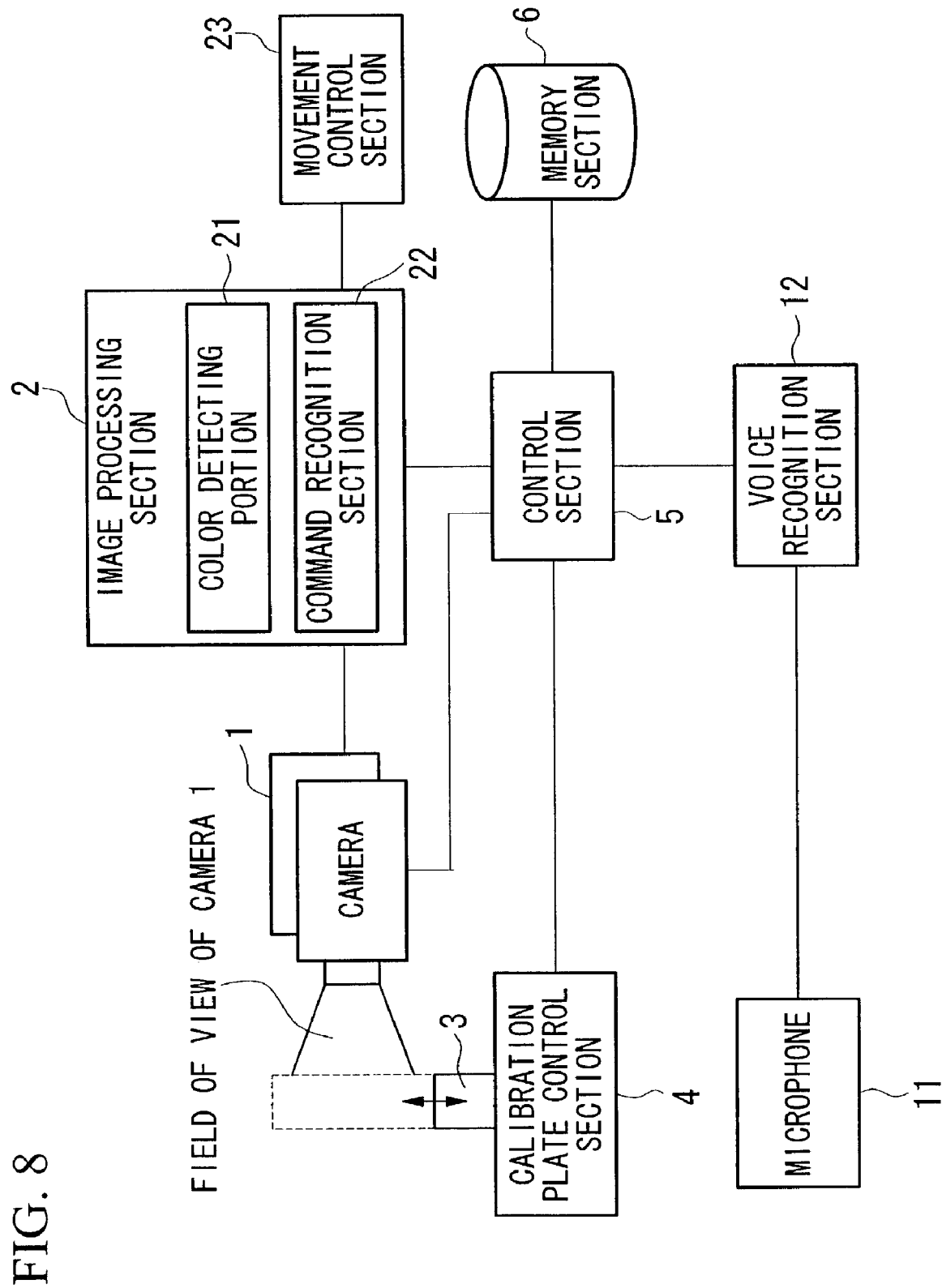
FIG. 8 is a block diagram showing a fourth embodiment of the present invention.

Next, the imaging device for an autonomously movable body according to the fourth embodiment of the present invention will be explained below with reference to the appended drawings. FIG. 8 is a block diagram showing the structure of the fourth embodiment of the present invention. In FIG. 8, the same reference symbols are applied to the same elements as in the first embodiment shown in FIG. 1, and explanations thereof will be omitted. The imaging device shown in FIG. 8 differs from the first embodiment in that a microphone 11 and a voice recognition section 12 are further provided. The microphone 11 picks up a command voice from a person who orders that a white balance adjustment be performed. The voice recognition section 12 recognizes the command voice picked up by the microphone 11, and outputs voice recognition results to the control section 5. Furthermore, the image processing section 2 includes, in addition to the color detecting section 21, a command recognition section 22 which recognizes human motion or gesture of a person who orders that a white balance adjustment be performed.

Next, the operation of the imaging device for an autonomously movable body shown in FIG. 8 will be explained with reference to FIG. 9. First, the voice recognition section 12 receives the command voice picked up by the microphone 11. On the other hand, the command recognition section 22 receives the images of command motion of an operator taken by the camera 1 (step S21). The voice recognition section 12 determines whether the received voice is a command voice ordering a white balance adjustment to be performed, and sends the recognition results to the control section 5. The command recognition section 22 determines whether the obtained images indicate a command ordering a white balance adjustment to be performed, and sends the recognition results to the control section 5 (step S22).

Next, the control section 5 determines whether or not a command ordering a white balance adjustment to be performed is recognized by the voice recognition section 12 or by the command recognition section 22 (step S23). When it is determined that the command has not been recognized, the control section waits until the command is recognized. In contrast, when it is determined that the command voice or command gesture is recognized, the control section 5 sends a command to the calibration plate control section 4 so that the calibration plate 3 is moved to a position in front of the camera 1. At this time, the control section 5 reads out the relative positioning between the camera 1 and calibration plate 3 stored in the memory section 6, finds the amount of movement of the calibration plate 3, and sends information about the amount of movement to the calibration plate control section 4. Upon receiving the information, the calibration plate control section 4 makes the calibration plate 3 move to a position in front of the camera 1 (step S24). As a result, the calibration plate 3 covers the field of view of the camera 1 (two CCD cameras).

Next, the control section 5 sends a command to the camera 1 so as to perform a white balance adjustment. Upon receiving the command, the camera 1 performs a white balance adjustment while the calibration plate 3 covers the field of view (step S25). As a result, a white balance adjustment is performed, and an appropriate surrounding environment perception can be performed.

Alternatively, the command recognition section 22 may be constructed so as to recognize a marking indicating execution of a white balance adjustment from the images taken by the camera 1 during an autonomous movement of the movable body, and so that a white balance adjustment is performed when the marking is recognized. In this case, the calibration plate 3 may be provided in the vicinity of the marking indicating execution of a white balance adjustment, and a white balance adjustment may be performed in such a way that the movable body approaches the calibration plate 3 so that the calibration plate 3 covers the field of view of the camera 1.

As explained above, because the control device is constructed so that a white balance adjustment is performed in accordance with a command from outside, a white balance adjustment can be performed at a freely selected time. Moreover, if markings are provided where a white balance adjustment must be performed, the necessity of performing a white balance adjustment need not be determined autonomously; therefore, processing load to the control section 5 can be reduced.

Furthermore, the control device may be constructed so that the control section 5 stops control for performing a white balance adjustment: (1) when the image processing section 2 and photometry section 13 are performing color detection; (2) when the battery for operating the movable body is degraded during execution of a white balance adjustment or during movement of the calibration plate 3; or (3) when the camera 1 is broken.

Figure 5:
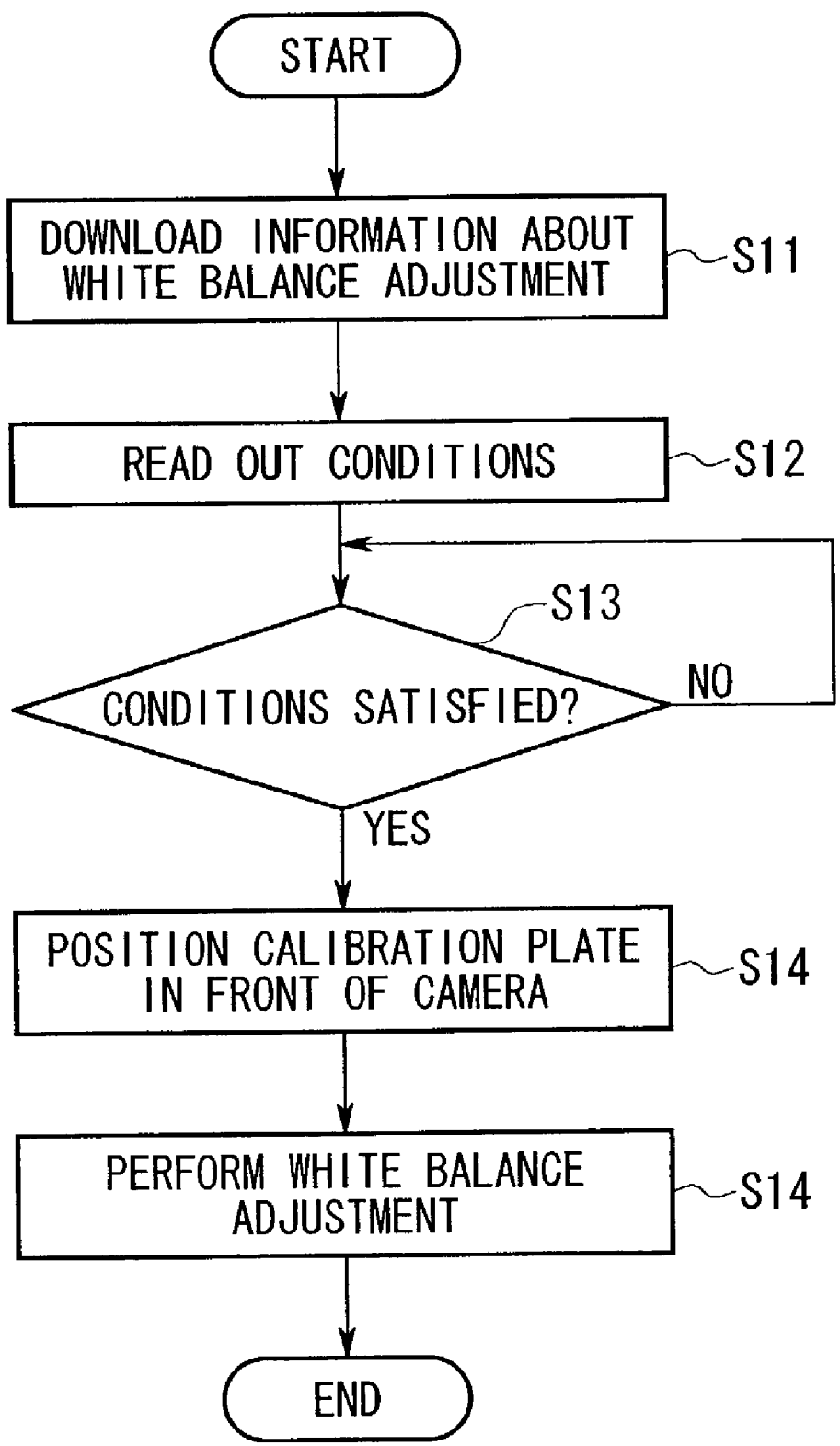
FIG. 5 is a flowchart showing the operation of the device shown in FIG. 2.
Figure 9:
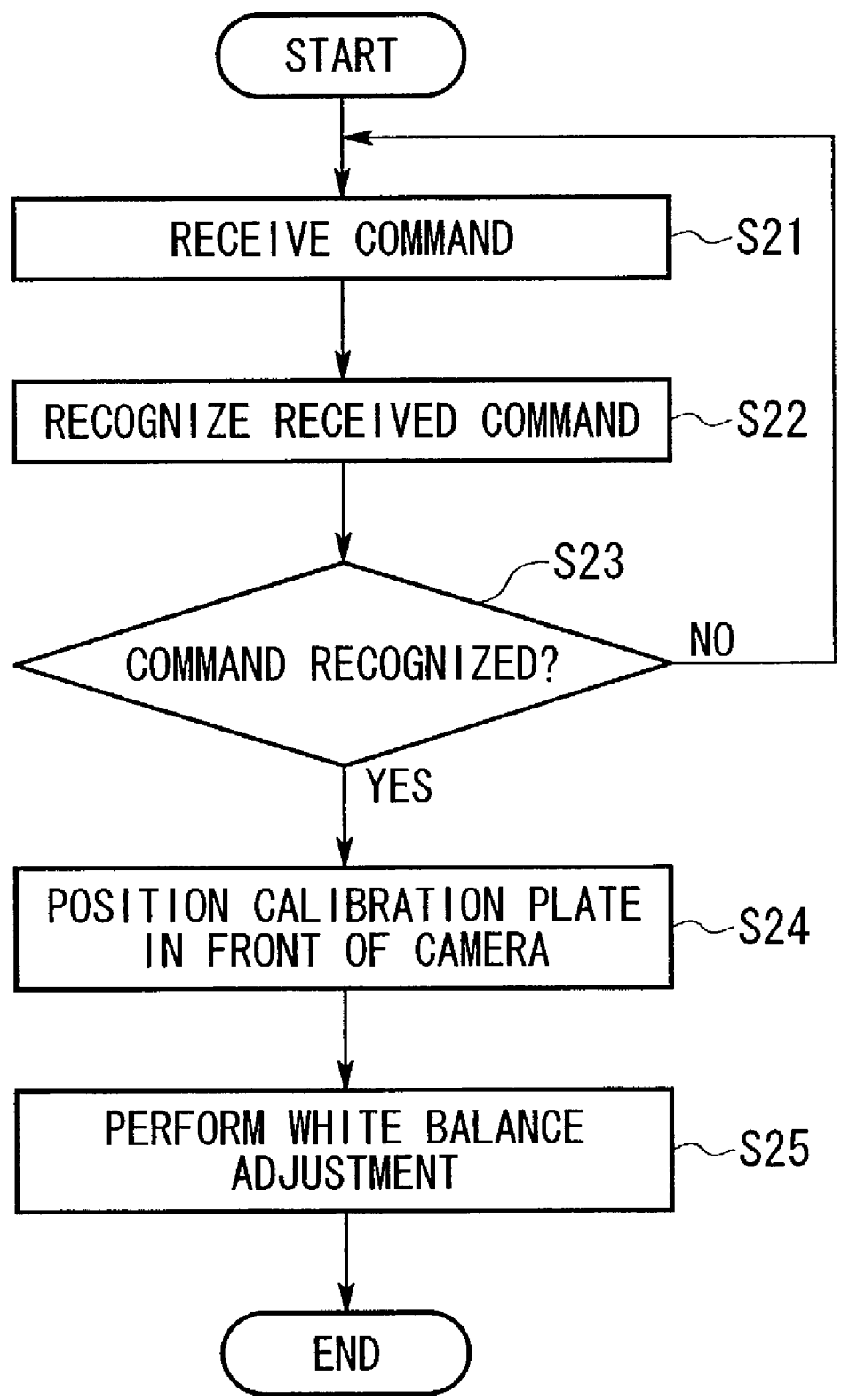
FIG. 9 is a flowchart showing the operation of the device shown in FIG. 4.

Note that the programs for executing the operations shown in FIGS. 2, 5, and 9 may be recorded in a computer-readable recording medium, and color correction may be performed by making a computer system read out the programs recorded in the recording medium and execute the programs. The "computer system" herein referred to includes an OS (Operating System) and hardware such as peripheral devices. The "computer-readable recording medium" herein referred to includes a portable recording medium such as a flexible disc, optical magnetic disc, ROM, and CD-ROM, and memory device such as a hard-disc integrated in a computer system. In addition, the "computer-readable recording medium" further includes a device, which can store programs for a certain period, such as a volatile memory (RAM) installed in a computer system that functions as a sever or client when programs are provided via a network such as internet or telephone lines.

The aforementioned program may be transmitted from a computer system which stores the program in a memory device thereof to another computer system via a transmission medium or carrier wave in a transmission medium. The "transmission medium" herein referred to means a medium, which can transmit information, such as a network, e.g., internet or the like, transmission lines, e.g., telephone lines or the like. Moreover, the transmitted program may function for only a portion of the above-described operations. Furthermore, the transmitted program may be a program generally known as a differential file (differential program) which complements the program stored in the computer system so as to achieve the above-described operations.

Advantageous Effects Obtained by the Invention

As explained above, according to the imaging device of the present invention, because the calibration plate is moved into a field of view of the image-taking section, and color correction is performed when it is determined that the images taken by the image-taking section are not appropriate to perform color detection, an effect is obtained that an appropriate calibration of the imaging device can be effectively performed. Moreover, because the calibration plate is under ambient light, and color correction is performed using ambient light reflected by the surface of the calibration plate, color correction can be performed in substantially the same state as in a state in which surrounding environment perception is performed. As a result, because color correction is performed in a state in which the image-taking section is presently placed, the accuracy of color detection can be improved.

According to another imaging device of the present invention, because the color detection determination is performed depending on changes in the surrounding ambient light, an effect is obtained that an appropriate calibration of the imaging device can be effectively performed upon changes in the surrounding ambient light.

According to another imaging device of the present invention, because the color detection determination is performed depending on the present position of the autonomously movable body in a map defining a movable area of the autonomously movable body, or based on time, an effect is obtained that an appropriate calibration of the imaging device can be effectively performed at positions or times determined in advance.

According to another imaging device of the present invention, because the color detection determination is performed in accordance with commands sent from an operator, an effect is obtained that a calibration of the imaging device can be effectively performed at a freely selected time.

According to a calibration method of the present invention, the calibration plate, which is used for color correction by the image-taking section, is moved into a field of view of the image-taking section when color detection cannot be performed, and color correction is performed when the calibration plate is in the field of view of the image-taking section, i.e., color correction is performed in accordance with the result of the color detection determination; therefore, an effect is obtained that an appropriate calibration of the imaging device can be effectively performed.

According to another calibration method of the present invention, the calibration plate, which is used for color correction by the image-taking section, is moved into a field of view of the image-taking section in accordance with the information about times or positions stored, and color correction is performed when the calibration plate is in the field of view of the image-taking section, i.e., color correction is performed when the predetermined position or time is reached; therefore, an effect is obtained that a calibration of the imaging device can be effectively performed in accordance with the changes in environment.

According to another imaging device of the present invention, the voice recognition section recognizes a command voice picked up by a microphone, and when the voice recognition results are a command for the image-taking section to perform color correction, the white calibration plate, which is used to perform color correction by the image-taking section, is moved into a field of view of the image-taking section, and color correction is performed when the calibration plate is in the field of view of the image-taking section, i.e., color correction is performed in accordance with the command from outside; therefore, an effect is obtained that a calibration of the imaging device can be effectively performed at a freely selected time.

According to another imaging device of the present invention, the command recognition section recognizes human motion or gesture in the images taken by the image-taking section, and when the recognition results are a command for the image-taking section to perform calibration, the white calibration plate, which is used to perform color correction by the image-taking section, is moved into a field of view of the image-taking section, and color correction is performed when the calibration plate is in the field of view of the image-taking section, i.e., color correction is performed in accordance with the command from outside; therefore, an effect is obtained that a calibration of the imaging device can be effectively performed at a freely selected time.

According to another imaging device of the present invention, because the calibration plate is installed on an arm of the humanoid robot, an effect is obtained that the field of view of the image-taking section can be covered by the calibration plate at a freely selected position and at a freely selected time.

According to another imaging device of the present invention, because the calibration plate is carried by the humanoid robot, an effect is obtained that the field of view of the image-taking section can be covered by the calibration plate at a freely selected position and at a freely selected time.

What is claimed is:

1. An imaging device installed on an autonomously movable body which comprises an image-taking section for taking images of the surrounding environment, and an object detecting section for detecting objects and obstacles by processing the obtained images, said imaging device comprising:
    an image processing section to perform color detection of said images taken by said image-taking section;
    a white calibration plate for said image-taking section to perform color correction; and
    a calibration plate control section for moving said calibration plate into a field of view of said image-taking section,
    wherein it is determined, depending on changes in surrounding ambient light, whether color information which is sufficient to perform color detection is obtainable from said images taken by said image-taking section, and color correction is performed using said calibration plate when it is determined that said images taken by said image-taking section do not provide color information sufficient to perform color detection, and
    wherein the determination as to whether color information which is sufficient to perform color detection is obtainable from said images is performed depending on whether each intensity of RGB of an expected object is within a predetermined range.

2. An imaging device for an autonomously movable body according to claim 1, wherein said color detection determination is performed depending on the present position of said autonomously movable body in a map defining a movable area of said autonomously movable body, or based on time.

3. An imaging device for an autonomously movable body according to claim 1, wherein said color detection determination is performed in accordance with commands sent from an operator.

4. An imaging device for an autonomously movable body according to claim 1, wherein color detection determination is performed depending on whether or not said image processing section can perform color detection.

5. An imaging device for an autonomously movable body according to claim 2 further comprising:
    a memory section for storing information in advance about times or positions at which said image-taking section performs color correction; and
    a control section which makes said calibration plate control section move said calibration plate, and which sends a command to said image-taking section to perform color correction in accordance with said information about times or positions stored in said memory section.

6. An imaging device for an autonomously movable body according to claim 3 further comprising:
    a voice recognition section which recognizes a command voice picked up by a microphone, and which outputs voice recognition results; and
    a control section which makes said calibration plate control section move said calibration plate while making said image-taking section perform color correction when said voice recognition results obtained by said voice recognition section are a command for said image-taking section to perform color correction.

7. An imaging device for an autonomously movable body according to claim 3 further comprising:
    a command recognition section which recognizes human motion in said images taken by said image-taking section, and which outputs recognition results; and
    a control section which makes said calibration plate control section move said calibration plate while making said image-taking section perform color correction when said recognition results obtained by said command recognition section are a command for said image-taking section to perform calibration.

8. An imaging device according to claim 1, wherein said autonomously movable body is a bipedal humanoid robot, and said calibration plate is installed on an arm of said humanoid robot.

9. An imaging device according to claim 1, wherein said autonomously movable body is a bipedal humanoid robot, and said calibration plate is carried by said humanoid robot.

10. A calibration method for an imaging device installed on an autonomously movable body which comprises an image-taking section for taking images of the surrounding environment, and an object detecting section for detecting objects and obstacles by processing the obtained images, said calibration method comprising the steps of:
    processing images for detecting colors in said images taken by said image-taking section;
    determining, depending on changes in surrounding ambient light, whether color information which is sufficient to perform color detection is obtainable from said images taken by said image-taking section;
    controlling a white calibration plate, which is used for color correction by said image-taking section, so that said calibration plate moves into a field of view of said image-taking section when it is determined that said images taken by said image-taking section do not provide color information sufficient to perform color detection; and
    performing color correction when said calibration plate is in said field of view of said image-taking section,
    wherein the determination as to whether color information which is sufficient to perform color detection is obtainable from said images is performed depending on whether each intensity of RGB of an expected object is within a predetermined range.

11. A computer readable recording medium storing: a calibration program for an imaging device installed on an autonomously movable body which comprises an image-taking section for taking images of the surrounding environment, and an object detecting section for detecting objects and obstacles by processing the obtained images, said calibration program makes a computer execute the processes of: processing images for detecting colors in said images taken by said image-taking section; determining, depending on changes in surrounding ambient light, whether color information which is sufficient to perform color detection is obtainable from said images taken by said image-taking section; controlling a white calibration plate, which is used for color correction by said image-taking section, so that said calibration plate moves into a field of view of said image-taking section when it is determined that said images taken by said image-taking section do not provide color information sufficient; and performing color correction when said calibration plate is in said field of view of said image-taking section, wherein the determination as to whether color information which is sufficient to perform color detection is obtainable from said images is performed depending on whether each intensity of RGB of an expected object is within a predetermined range.

* * * * *